(12) United States Patent
Amon et al.

(10) Patent No.: US 8,948,739 B2
(45) Date of Patent: Feb. 3, 2015

(54) METHODS AND DEVICES FOR THE TRANSMISSION OF SCALABLE DATA

(75) Inventors: Peter Amon, München (DE); Andreas Hutter, München (DE); Thomas Rathgen, Ilmenau (DE)

(73) Assignee: Siemens Aktiengesellschaft, Munich (DE)

( * ) Notice: Subject to any disclaimer, the term of this patent is extended or adjusted under 35 U.S.C. 154(b) by 1244 days.

(21) Appl. No.: 11/795,070

(22) PCT Filed: Dec. 13, 2005

(86) PCT No.: PCT/EP2005/056737
§ 371 (c)(1),
(2), (4) Date: Jul. 11, 2007

(87) PCT Pub. No.: WO2006/074848
PCT Pub. Date: Jul. 20, 2006

(65) Prior Publication Data
US 2008/0214176 A1    Sep. 4, 2008

(30) Foreign Application Priority Data
Jan. 11, 2005   (DE) .......................... 10 2005 001 286

(51) Int. Cl.
*H04W 4/00*     (2009.01)
*G06K 9/46*     (2006.01)
(Continued)

(52) U.S. Cl.
CPC ... *H04N 21/4621* (2013.01); *H04N 21/234327* (2013.01); *H04N 21/64792* (2013.01); *H04W 84/042* (2013.01); *H04W 84/12* (2013.01)
USPC .......................... 455/422.1; 382/243; 348/385

(58) Field of Classification Search
CPC .................. H04N 21/234327; H04N 21/4621; H04N 21/4792; H04W 84/042; H04W 84/12

USPC ........ 375/240; 455/422.1; 382/243, 408, 385; 348/385, 387
See application file for complete search history.

(56) References Cited

U.S. PATENT DOCUMENTS 5,612,742 A * 3/1997 Krause et al. ............. 375/240.25
6,233,356 B1 * 5/2001 Haskell et al. ................ 382/243
(Continued)

FOREIGN PATENT DOCUMENTS

| CN | 1228221 A | 9/1999 |
|---|---|---|
| EP | 0 928 086 A1 | 7/1999 |
| WO | 2004/056112 A1 | 7/2004 |

OTHER PUBLICATIONS

Zgaljic T., et al., "Bitstream Syntax Description based Adaptation of Scalable Video", Proc. European Workshop on the Integration of Knowledge, Semantic and Digital Media Technologies (EWIMT), Nov. 20, 2005, London, pp. 1-6, XP002368922, online: http://www.iee.org/oncomms/pn/visualinformation/ewimt2005_0073.pdf.
(Continued)

*Primary Examiner* — Kent Chang
*Assistant Examiner* — Kuo Woo
(74) *Attorney, Agent, or Firm* — Staas & Halsey LLP (57) ABSTRACT

ANS method for transmitting data, in which basic data is transmitted while one or several packets are transmitted with data that complements the basic data and increases the quality of the basic data when being decoded by a receiver. The packets contain at least one field with information about how the complementing data of the respective packet increases the quality of the basic data. The field can be read independently of the complementing data of the respective packet. Based on the information, a decision can be made as to whether the packets are to be forwarded or decoded.

21 Claims, 3 Drawing Sheets

(51) Int. Cl.
*H04N 7/12* (2006.01)
*H04N 21/462* (2011.01)
*H04N 21/2343* (2011.01)
*H04N 21/647* (2011.01)
*H04W 84/04* (2009.01)
*H04W 84/12* (2009.01)

(56) References Cited

U.S. PATENT DOCUMENTS

| | | | |
|---|---|---|---|
| 6,546,144 | B1 | 4/2003 | Fukuhara et al. |
| 6,592,010 | B2 | 7/2003 | Plessis |
| 2001/0028748 | A1 | 10/2001 | Sato et al. |
| 2002/0179649 | A1 | 12/2002 | Plessis |
| 2004/0207870 | A1 | 10/2004 | Takahashi et al. |

OTHER PUBLICATIONS

Sprljan N. et al., "A Scalable Coding Framework for Efficient Video Adaptation", WIAMIS 2005, Apr. 13, 2005, pp. 1-4, Montreux, Switzerland, online: http://www.cost292.org/pubs/wiamis05/cr1076.pdf. H.264/MPEG-4 AVC.

Schwarz H. et al., "MCTF and Scalability Extension of H.264/AVC" Proc. PCS'04, Dec. 15, 2004, San Franciso, CA; USA online: http://ip.hhi.de/imagecom_G1/savce/documents/PCS2004.pdf.

Francois E., et al., "MPEG SVC: Why a new video standard?", Broadband Europe, Aug. 12, 2004, pp. 1-5, XP002368921.

Gomila Christina, Yin, Peng: New features and Application of the H.264 video Coding, IEEE, 2003, pp. 6-10.

English Translation of the Chinese Office Action issued Oct. 16, 2009 in corresponding Chinese Patent Application 200580046388.8.

Francois E., et al., "MPEG SVC: Why a new video standard?", Broadband Europe, Dec. 8, 2004, pp. 1-5, XP002368921; Others; 2004.

Mukherjee et al., "Structured Scalable Meta-formats (SSM) version 1.0 for content agnostic Digital Item Adaptation", ISO/IEC JTC1/SC29/WG11 MPEG2002/M9131, Dec. 2002.

Duden Online; "gruppeiren"; http://www.duden.de/rechtschreibung/gruppieren; 2013; DE; Jun. 26, 2013, 3 pages.

Debargha Mukherjee et al. "Structured Content Independent Scable Meta-formats (SCISM) for Media Type Agnostic Transcoding" Imaging Systems Laboratory HPL-2002-166 (R.1); hplnvent; 2002; US; Aug. 6, 2002, 26 pages.

Summons for Oral Proceedings received Sep. 12, 2013 in corresponding European Application No. 2005P00319WE, 7 pages.

* cited by examiner

METHODS AND DEVICES FOR THE TRANSMISSION OF SCALABLE DATA

CROSS REFERENCE TO RELATED APPLICATION

This application is based on and hereby claims priority to PCT Application No. PCT/EP2005/056737 filed on Dec. 13, 2005 and German Application No. 10 2005 001 286.8 filed on Jan. 11, 2005, the contents of which are hereby incorporated by reference.

The invention relates to methods and devices for the transmission of information in which basic information complementing the basic data are transmitted.

BACKGROUND

In communication systems, messages are transmitted between transmitter and receiver. Radio communication systems are a specific example of communication systems. Here, messages comprising, for example, voice information, image information, video information, SMS (Short Message Service), MMS (Multimedia Messaging Service) or other data, are transmitted with the aid of electromagnetic waves between transmitting and receiving radio station via a radio interface. Depending on the specific embodiment of the radio communication system, the radio stations here can be various types of subscriber-side radio stations or network-side radio devices such as base stations or radio access points. In a mobile radio communication system, at least some of the subscriber-side radio stations are mobile radio stations. The electromagnetic waves are emitted using carrier frequencies which lie in the frequency band provided for the respective system.

Mobile radio communication systems are often configured as cellular systems e.g. in conformance with the GSM (Global System for Mobile Communication) or UMTS (Universal Mobile Telecommunications System) standard, with a network infrastructure including e.g. base stations, devices for monitoring and controlling the base stations and further network-side devices. Apart from these cellular, hierarchical radio networks organized on a wide-area (supralocal) basis, there are also wireless local area networks (WLANS) with a range of radio coverage that is as a rule significantly more limited spatially.

In the transmission of scalable data, the basic information is transmitted and, in addition, information complementing the basic information. Scalable data consequently has the property that it can be available at the receiver with a reduced quality, the receiver decoding only the basic information or the basic information and some the complementing information, and not the basic information and all of the complementing information. Data which is transmitted simultaneously to multiple subscribers can as scalable information be transmitted by the transmitter with the optimum possible quality, i.e. as basic information and complementing information. When the data is distributed in the communication network to the different receivers, the data can be adapted/scaled such that different parts of the complementing data are forwarded to the different receivers, so that only the complementing information needed or requested by the respective receiver is transmitted. Due to the shortage of transmission resources, this proves to be advantageous in radio communication systems in particular. The adaptation/scaling can also be carried out by a terminal device which decides to decode only some of the complementing information.

SUMMARY

One possible object is to indicate methods and devices for the transmission and reception of scalable data.

The inventors propose a method for the transmission of information, basic information is transmitted, and one or more packets comprising information complementing the basic information are transmitted. The complementing information increases, if it is decoded by a receiver, the quality of the basic information. The packets contain at least one field comprising details about how the complementing information of the respective packet increases the quality of the basic information, it being possible for the at least one field to be read out independently of the complementing information of the respective packet.

Both basic information and complementing information which increases the quality of the basic information if a receiver decodes it in addition to the basic information are transmitted. The basic information can also be decoded and processed at the receiver end without the complementing information; reception of the complementing information is not necessary for this purpose. The basic information and the complementing information are scalable information. Transmission of the basic information preferably takes place before transmission of the complementing information.

The basic information and complementing information can be generated by coding data. This data can, for example, be image information, audio information, video information, voice information or even a combination of these types of information.

In particular, it is advantageous if the complementing information is transmitted without a specific request to do so being sent. Thus, for example, a receiver can request specific data, whereupon the transmitter transmits this data as basic information and in addition, without specifically being requested to do so by the receiver, the complementing information. In this case, a request is sent which relates to both the basic information and the complementing information, and not a separate request for the basic information and the complementing information.

The packets comprising the complementing information contain at least one field comprising data about the manner of the increase in quality which the basic information undergoes as a result of decoding of the complementing information. These details can e.g. be realized in details of one or more numerals or bits, it being known to the receiver of the details the manner in which the numeric details correspond to the increase in quality. The manner of the increase in quality can represent a quantitative and/or a qualitative detail such as e.g. a direction of the quality increase in conjunction with an amount, it being possible for the amount to be expressed as an absolute or relative to a reference.

The at least one field can be read out independently of the complementing information of the respective packet. This means that the content of the at least one field can be read out without the complementing information of the respective packet or some of the complementing information of the respective packet having to be read out. Consequently, when it has to be established in which manner the complementing information of a packet increases the quality of the basic information, a decoding of complementing information can be completely dispensed with since examination or decoding of the at least one field will suffice for this purpose.

Information is transmitted about which grouping is used for the complementing information. This is particularly advantageous if several possible groupings exist which are optionally known to the receiver, and a selection is made from these possible groupings. A grouping of the complementing information corresponds to a summarizing of the complementing information, it being possible for each group in which the complementing information is summarized to contain one or more of the items of complementing information. The configuration of the details about the quality increase can depend on the selected grouping and the details can accordingly be adapted to the chosen grouping. So, for example, a defined grouping may entail a defined structure of the details.

The information about the grouping is transmitted upon connection establishment and the corresponding grouping is used for the subsequent transmission of the complementing information. In this case, the communication about the grouping is separate from the transmission of the basic and complementing data, and takes place in advance of this transmission.

As an alternative to transmitting the information about the grouping in advance, the information about the grouping can also be contained in the at least one field. So, particularly where there are two possible groupings, a bit can be inserted which shows for each packet comprising complementing information the manner in which the complementing information of the packet is grouped.

According to an advantageous embodiment, information about the configuration of the at least one field is transmitted. This can relate e.g. to the length of the field or fields, or to the parameters which the field or the fields are populated or to value ranges for these parameters.

In a further development, the details of a packet are incorporated in a decision as to whether the packet is to be forwarded to a receiver. This is possible e.g. in a situation in which the packets are transmitted from a transmitter to a first receiver which is responsible for forwarding the received packets to a second receiver. Using the data of the packets, the first receiver then takes the decision about forwarding to the second receiver. As well as the data, further variables can be incorporated in the decision about forwarding. This method can be carried out in relation to one, several or all packets comprising the complementing information.

According to a different development, the data of a packet is incorporated in a decision as to whether the packet is to be decoded by a receiver. This is possible e.g. in a situation where a receiver has received packets comprising complementing information, but only some of these packets can be decoded or are to be decoded. Besides the data, other variables can be incorporated in the decision about forwarding. This method can be implemented in relation to one, several or all packets comprising the complementing information.

It is advantageous if the data shows that the complementing information increases the quality of the basic information by increasing the temporal resolution and/or increasing the spatial resolution and/or increasing the signal-to-noise ratio. The data can also contain quantitative data in relation to the cited increasing variables.

In an embodiment, the at least one field is an integral part of a packet header. A packet header stands at the beginning of a packet and carries signaling information. This embodiment makes it possible to read out the data about the manner of the quality increase without having to consider the remaining content of the packet that follows the header.

The basic information is advantageously video information. It is particularly advantageous if this is to be transmitted to a radio receiver. The video information can be transmitted e.g. by a transmitter over a line and forwarded via radio by a different device to the radio receiver.

According to a first method for the receiving and processing of information by a receiver, basic information is received and one or more packets comprising information complementing the basic information, which complementing information, upon decoding, increases the quality of the basic information. The packets contain at least one field comprising data about how the complementing information of the respective packet increases the quality of the basic information, it being possible for the at least one field to be read out independently of the complementing information of the respective packet. The data of a packet is incorporated by the receiver in a decision as to whether the packet is to be forwarded to a different receiver.

According to a second method for the receiving and processing of information by a receiver, basic information is received and one or more packets comprising information complementing the basic information, which complementing information, upon decoding, increases the quality of the basic information. The packets contain at least one field comprising data about how the complementing information of the respective packet increases the quality of the basic information, it being possible for the at least one field to be read out independently of the complementing information of the respective packet. The data of a packet is incorporated by the receiver in a decision as to whether the packet is to be decoded by the receiver.

The methods for the receiving and processing of information by a receiver can be applied in relation to one or more received packets comprising complementing information. In a development, the described steps of the method for the transmission of information can be an integral part of the methods for the receiving and processing of information by a receiver.

The transmitter for the transmission of information has a first transmission unit for the transmission of basic information, and a second transmission unit for the transmission of one or more packets comprising information complementing the basic information, which complementing information, upon decoding by a receiver, increases the quality of the basic information. The transmitter comprises an insertion unit for the insertion in the packets of at least one field comprising data about how the complementing information of the respective packet increases the quality of the basic information. The data is inserted in the packets such that the at least one field can be read out independently of the complementing information of the respective packet.

The transmitter can also be realized in several devices connected to one another which, in combination with one another, provide the functionality.

A first receiver for the receiving and processing of information has a first receiver unit for receiving basic information and a second receiver unit for receiving one or more packets comprising information complementing the basic information, which complementing information, upon decoding, increases the quality of the basic information, the packets containing at least one field comprising details about how the complementing information of the respective packet increases the quality of the basic information, it being possible for the at least one field to be read out independently of the complementing information of the respective packet. Furthermore, it comprises a decision unit for deciding with regard to one or more of the packets using the data as to whether the respective packet is to be forwarded to a different receiver.

A second receiver for the receiving and processing of information has a first receiver for receiving basic information and a second receiver unit for receiving one or more packets comprising information complementing the basic information, which complementing information, upon decoding, increases the quality of the basic data, the packets containing at least one field comprising details about how the complementing information of the respective packet increases the quality of the basic information, it being possible for the at least one field to be read out independently of the complementing information of the respective packet. Furthermore, it comprises a decision unit for deciding with regard to one or more of the packets using the details as to whether the respective packet is to be decoded.

The transmitter and the receivers are particularly suitable for implementing the methods, it also being possible for this to apply to the embodiments and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
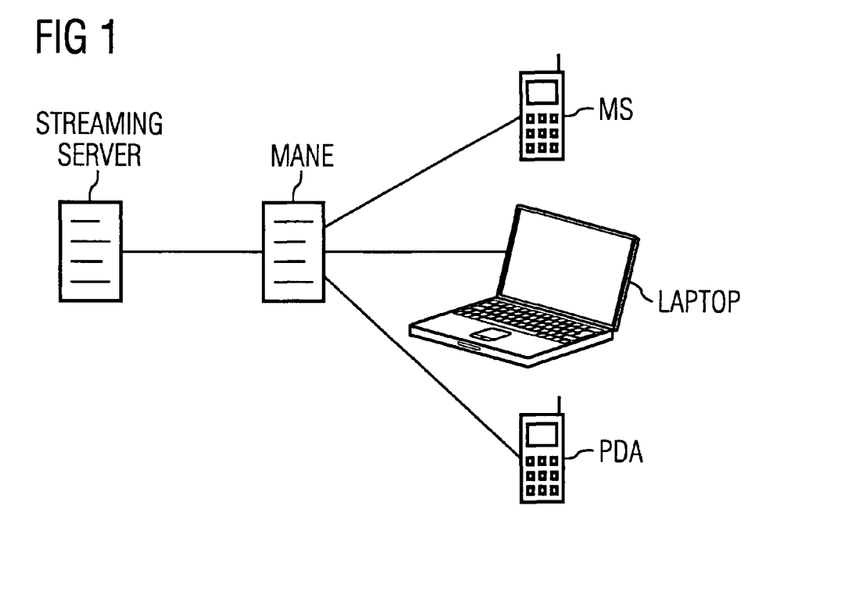
FIG. 1 shows an extract from a communication network.

The extract from a communication network shown in FIG. 1 comprises the transmitter STREAMING SERVER, a distributing station MANE (Media Aware Network Element) and the subscriber station MS in the form of a mobile telephone, the subscriber station LAPTOP in the form of a portable computer, and the subscriber station PDA in the form of a personal digital assistant. The connection between the transmitter STREAMING SERVER and the distributing station MANE is effected e.g. via the Internet. Between the distributing station MANE and the subscriber stations MS, LAPTOP and PDA, which receive the information transmitted by the transmitter STREAMING SERVER via radio, transmission can be effected via further devices.

Figure 2:
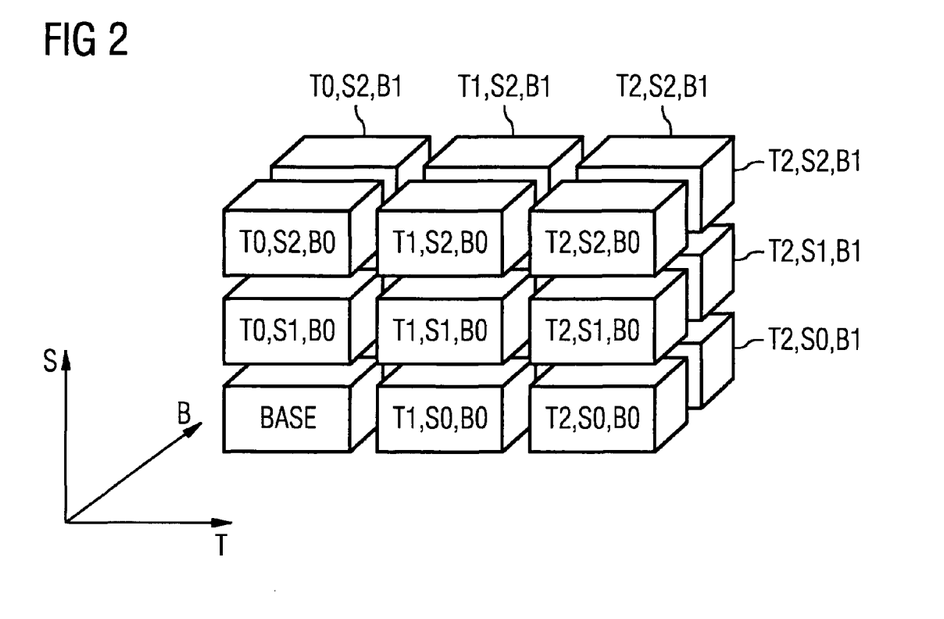
FIG. 2 shows symbolically the components of scalable data.

The transmitter STREAMING SERVER transmits video information in real time as scalable data, represented symbolically in FIG. 2. The scalable data is present at the transmitter end as the result of a coding of video information. This coding is preferably carried out by the transmitter STREAMING SERVER. The block in the bottom left corner of FIG. 2 corresponds to the basic information BASE. The other blocks, indicated by the variables T, B and S, correspond to the complementing information. The T axis running to the right indicates how many images are transmitted per unit of time, for example the first blocks on the right can correspond to a data rate of 7.5 fps (fps: frames per second), the second blocks on the right to a data rate of 15 fps and the third blocks on the right to a data rate of 30 fps. The S axis running vertically upward indicates how good the spatial resolution of the respective image is, i.e. how many pixels an image contains, for example the first blocks up may correspond to QCIF (Quarter Common Intermediate Format, corresponding to an image size of 176×144 pixels), the second blocks up to CIF (Common Intermediate Format, corresponding to an image size of 352×288 pixels), and the third blocks up to 4CIF (4 Times Common Intermediate Format, corresponding to an image size of 704×576 pixels). The B axis running toward the rear indicates the signal-to-noise ratio (SNR) of an image. Consequently, the temporal resolution of the video information increases to the right, the spatial resolution upwards and the signal-to-noise ratio to the rear. Each block in FIG. 2 contains the data which is needed for improving the visual quality by one level in a direction of the three scalability dimensions.

The method can also be applied to the transmission of still images. In this case, in place of the three scalability dimensions shown in FIG. 2, there are only two dimensions and the T axis does not apply. The method is also suitable for use in relation to audio information. Furthermore, use of a different number of scalability dimensions or of scalability dimensions other than those shown in FIG. 2 in relation to video or other information is also feasible within the scope.

It suffices in principle if a receiver receives and decodes the basic information BASE, but this information is not of high quality. In order to be able to display the video information a subscriber station must decode at least the basic information BASE. The decoding of each further block from FIG. 2 in addition to the basic information BASE improves the quality of the video information. Depending on the coding method used, the blocks comprising the complementing information cannot be combined in any random sequence with the basic information BASE. Thus, under H.264/MPEG-4 AVC, for example, the block T0,S2,B0 cannot be decoded before the block T0,S1,B0.

The video information is output by the coder at the transmitter end according to a scalable extension of the standard H.264/MPEG-4 AVC, described e.g. in Heiko Schwarz, Detlev Marpe, and Thomas Wiegand: MCTF and Scalability Extension of H.264/AVC, Proc. PCS'04, San Francisco, Calif., USA, Dec. 15-17, 2004 in the form of NALUs (Network Abstraction Layer Units). The NALUs are logically compiled to form the blocks shown in FIG. 2, it being possible for each block to contain one or more NALUs. The blocks shown in FIG. 2 may for example be the coded data of a group of pictures (GOP). For the real-time transmission of video information, the real-time transport protocol RTP is used. In RTP, specific RTP payload formats, i.e. the formats of the RTP packets used for transporting the data, are defined for different coding methods. In accordance with these formats, RTP packets are created at the transmitter end from the blocks shown in FIG. 2, it being possible for each RTP packet to contain parts of a block, a block or multiple blocks. The RTP packets are transmitted by the transmitter STREAMING SERVER to the distributing station MANE which is responsible for the forwarding of RTP packets to the subscriber stations MS, LAPTOP and PDA.

Depending on the embodiments and requirements of the subscriber stations MS, LAPTOP and PDA, the basic information BASE and a differing number and composition of packets comprising the complementing information are forwarded to these subscriber stations. So, for example, the basic information BASE and the complementing information T0,S1,B0 and T0,S2,B0 can be forwarded to the subscriber station LAPTOP, since the subscriber station LAPTOP has a large display area, and consequently a good spatial resolution of the video information is advantageous, while the basic information BASE and the complementing information T0,S1,B0 and T1,S1,B0 are forwarded to the subscriber station PDA which places value on a good temporal resolution.

The transmitter STREAMING SERVER transmits the basic information BASE and all the packets comprising complementing information. Selection of the complementing information depending on the receiver takes place in the distributing station MANE, i.e. the distributing station MANE decides which packet is to be forwarded to which receiver. Alternatively, however, this selection can also be carried out by the transmitter STREAMING SERVER, or by the receiver itself that receives all the packets comprising complementing information and decides which packets are decoded. In order to keep the extent of work in the distributing station MANE low, decoding of the video information in the distributing station MANE is dispensed with. To do this, the distributing station MANE can recognize from the header of the packets containing the complementing information which complementing information is involved.

Figure 3A:
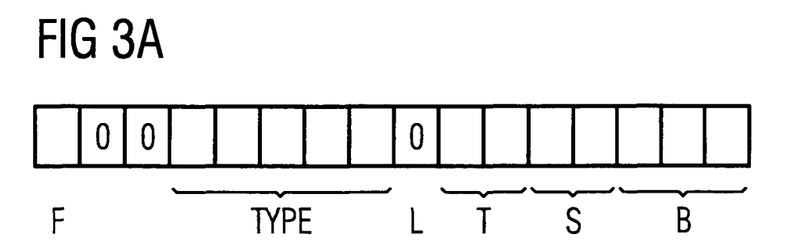
FIG. 3a shows a first proposed header configuration.

FIG. 3a shows a first header of a packet containing complementing information, which header contains 16 bits or 2 bytes. In initial position stands the field F contains 1 bit, which field is normally an integral part of an RTP header in the transmission of H.264/MPEG-4 AVC-coded video information. The value 0 signals that the subsequent NALU should contain no bit error. A value of 1 on the other hand signals that the subsequent NALU may contain bit errors. The distributing station MANE can set this bit to 1 if the NALU has been damaged in any way. Following the field F are two bits which here are optionally set to zero, since the normal functionality of these two bits, which normally signal dependencies in the transmission of H.264/MPEG-4 AVC-coded video information, is not needed. The two zeros are followed by a field TYPE contains of 5 bits, which field is normally an integral part of an RTP header in the transmission of H.264/MPEG-4 AVC-coded video information. Types 1 to 23 of the field TYPE are defined in H.264/MPEG-4 AVC, and types 24 to 29 serve in the signaling of RTP aggregation packets or fragmentation units, i.e. in displaying that the respective packet contains multiple NALUs or only a part of a NALU. Type 30 is the Escape type which can be used for displaying types not yet defined.

The field TYPE is followed by the field L containing of one bit. The value 0 signals that the subsequent 7 bits identify a class of complementing information. A class is understood here to mean a block in accordance with FIG. 2; thus the NALUs of the block T2,S0,B0, for example, form one class of NALUs. The field T containing two bits specifies the T value as per the T axis in FIG. 2, the field S, which likewise contains of two bits, specifies the S value as per the S axis in FIG. 2 and the field B, which contains three bits, specifies the B value as per the B axis in FIG. 2. The fields L, T, S and B which go beyond the described normal components of an RTP header in the transmission of H.264/MPEG-4 AVC-coded video information, contains in total of 1 byte. It is possible to use a different total number of bytes or bits for the fields L, T, S and B than that shown in FIG. 3a. Furthermore, a different allocation of the 7 bits shown in FIG. 3a between the fields T, S and B is feasible.

Figure 3B:
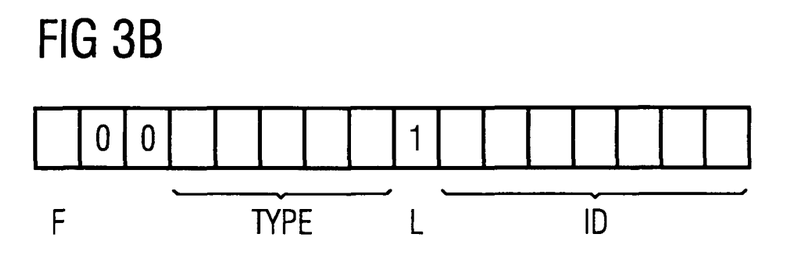
FIG. 3b shows a second proposed header configuration.

FIG. 3b shows a second header of a packet containing complementing information, which header contains 16 bits or 2 bytes. The significance of the fields in front of the field L does not differ from the header shown in FIG. 3a. In contrast to FIG. 3a, however, the field L in FIG. 3b is populated with the value 1. This value 1 signals that the subsequent 7 bits of the field ID identify a layer formed of a plurality of blocks from FIG. 2. A first layer can be formed, for example, of the blocks T0,S1,B0, T1,S1,B0, T1,S0,B0, T0,S0,B1, T1,S0,B1, T0,S1,B1 and T1,S1,B1, a second layer of the blocks T2,S0, B0, T2,S0,B1, T2,S1,B0 and T2,S1,B1, and a third layer of the blocks T0,S2,B0, T0,S2,B1, T1,S2,B0, T1,S2,B1, T2,S2, B0 and T2,S2,B1. The layers should be configured such that each layer has to contain in at last one scaling direction, i.e. in relation to at least one of the axes T, S or B, a higher resolution level than the next lower layer.

Use of the field L consequently supports two different forms of scalable representation of scalable data. If classes are used, then an adaptation is possible in several directions, so the basic information BASE can, as shown in FIG. 2, be improved by complementing information in the direction of the T axis and/or in the direction of the B axis and/or in the direction of the S axis. Where layers are employed, on the other hand, the direction of adaptation is predetermined and the adaptation is a unidirectional adaptation since the basic information BASE can be improved at first only by the complementing information of the first layer, then further by the complementing information of the second layer, etc. Consequently, a greater flexibility is possible in relation to the needs of the receiver if classes are used in place of layers. The decision as to whether classes or layers are used is taken by the transmitter STREAMING SERVER.

The configuration of the RTP packets used for transmitting video information is examined hereinbelow. In the generation of RTP packets, where classes are used, all the NALUs of one class are transmitted by the transmitter STREAMING SERVER in one RTP packet, provided the predetermined length of the RTP packet permits this. If this is not possible due to the limited quantity, then the NALUs of one class are divided between several consecutive RTP packets. The same also applies mutatis mutandis to layers.

Figure 4:
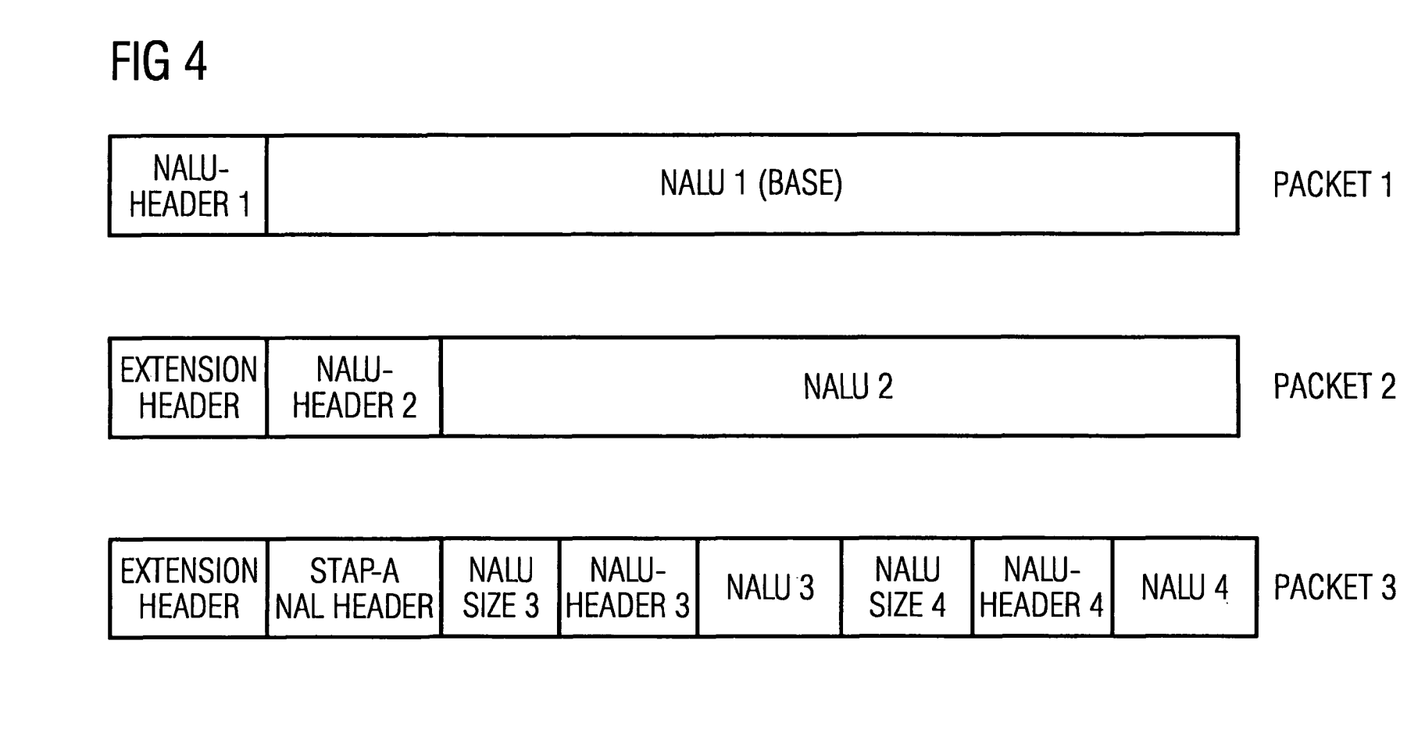
FIG. 4 shows the proposed configuration of data packets.

FIG. 4 shows the structure of three RTP packets PACKET 1, PACKET 2 and PACKET 3. The packet PACKET 1 contains a first NALU NALU 1 in the form of the basic information BASE. The header NALU-HEADER 1 of the packet PACKET 1 corresponds to the normal unmodified RTP header. No signaling of the basic information using the fields L, T, S and B, or L and ID takes place. Consequently, the basic information BASE is transmitted as described in the RTP payload format of H.264/MPEG-4 AVC.

The header of the packet PACKET 2 is formed of the header EXTENSION HEADER, which is configured as shown in FIG. 3a or 3b. The header EXTENSION HEADER signals that the subsequent content contains update data of the corresponding class or of the corresponding layer. It consequently indicates either the class or the layer of the NALU NALU 2 contained in the packet PACKET 2. The NALU NALU 2 may for example be the update data from a class T0 to a class T1. The header EXTENSION HEADER is followed by the header NALU-HEADER 1 which is configured as normal for the transmission of H.264/MPEG-4 AVC data via RTP.

The header of the packet PACKET 3 is formed of the header EXTENSION HEADER, which is configured as shown in FIG. 3a or 3b. Consequently, it indicates the class or layer of the NALUs NALU 3 and NALU 4 contained in the packet PACKET 3. The header EXTENSION HEADER is followed by the field STAP-A NAL HEADER, the header NALU SIZE 3 of the NALU NALU 3, and the header NALU-HEADER 3 of the NALU NALU 3, followed by the NALU NALU 3. After the NALU NALU 3, the packet PACKET 3 contains a further NALU NALU 4 which follows its headers NALU SIZE 4 and NALU-HEADER 4. The field STAP-A NAL HEADER (STAP-A: Single Time Aggregation Packet, Type A) signals e.g. that no further time information (time stamps) is used. The field NALU SIZE indicates respectively the length of the subsequent NALU, so that the end thereof can be recognized. The fields STAP-A PACKET HEADER, NALU SIZE 3, NALU-HEADER 3, NALU SIZE 4 and NALU-HEADER 4 are configured normally as for transmission of H.264/MPEG-4 AVC data via RTP.

In the case of fragmentation of a NALU into multiple RTP packets, the header EXTENSION HEADER is also transmitted, like the aggregation header of the packet PACKET 3, before the fragmentation header.

In the packets PACKET 1, PACKET 2 and PACKET 3, padding bits for filling up the RTP packets may stand at the end of each NALU.

The distributing station MANE decides, on the basis of the content of the headers EXTENSION HEADER of the packets PACKET 2 and PACKET 3 and its knowledge about the subscriber stations MS, LAPTOP or PDA, which packets are to be forwarded to the respective subscriber station MS, LAPTOP or PDA. In this way, only those blocks in FIG. 2 comprising complementing information which is needed by the respective subscriber station are transmitted.

The selection of RTP packets by the distributing station MANE is carried out without the distributing station MANE having to decode the NALUs. Consequently, neither decoding of the bitstream, nor knowledge about the structure of the NALUs or about the dependencies between various NALUs, is required. Instead, examination of the content of the header is sufficient for deciding whether the respective packet is to be forwarded to a certain receiver or not.

To decide whether an RTP packet is to be forwarded to a certain receiver, apart from the header EXTENSION HEADER no further information is needed by the transmitter of the RTP packet. In particular, after the receipt of an RTP packet there is no need to wait until information arrives about the type of complementing information before the decision about forwarding is taken, since the packet contains the information needed about the type of complementing information.

Those decoders which can decode only H.264/MPEG-4 AVC and not a scalable extension of H.264/MPEG-4 AVC, decode the packet PACKET 1. Based upon the header EXTENSION HEADER of the packets PACKET 2 AND PACKET 3, they ignore the packets PACKET 2 and PACKET 3. This is achieved by the fact that the type entry of the header EXTENSION HEADER is an escape code which signals to H.264/MPEG-4 AVC compatible decoders without scalable extension to ignore this packet. The described method is therefore downwardly compatible in relation to the non-scalable H.264/MPEG-4 AVC.

While the method has been described in accordance with FIG. 1 for the case of a distributing station MANE undertaking the selection of RTP packets and forwarding only the other packets in each case to a subscriber station, this selection can also be carried out by a subscriber station or a proxy. A subscriber station which can decode only H.264/MPEG-4 AVC and not the scalable H.264/MPEG-4 AVC, decodes the basic information BASE and ignores the packets which have a header EXTENSION-HEADER. Otherwise, a subscriber station can recognize from the header EXTENSION-HEADER the class or layer of the respective complementing information and thereupon decide whether the respective packet is to be decoded. This decision can be taken according to the same criteria which the distributing station MANE uses to decide about the forwarding of packets.

Before the transmission of video information, the principal scalability options are agreed between transmitter and receiver, i.e. either as shown in FIG. 1 between the transmitter STREAMING SERVER and the distributing station MANE, or alternatively between the transmitter STREAMING SERVER and the subscriber stations MS, LAPTOP and PDA. The issue here is the number of scalability dimensions and, for each scalability dimension, the number of levels. If layers are to be used, their number and composition must also be agreed. It can also be agreed how scaling is to be carried out, i.e. which blocks of complementing information are intended for which receiver or which type of receiver, optionally under which conditions. These agreements can be effected when the connection is established e.g. though the session description protocol, or else stipulated as standard. Alternatively, these agreements can also be communicated upon transmission of the video information. This is preferably effected using the class identification 0,0,0 or the layer identification 0, which is also used for the identification of basic information. Where the class identification 0,0,0 or the layer identification 0 is used, then, as described above, no header EXTENSION-HEADER is used.

Additional information about the content of the individual classes or layers or about preferred scaling strategies, i.e. which packets are to be forwarded to which subscriber stations or decoded by these, can preferably be transmitted in packets comprising a special class or layer identification from or to the distributing station MANE. Such additional information can be utilized in order to react dynamically to communication conditions and to adapt the data stream, correspondingly.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for transmitting of information comprising:
    transmitting a first packet with basic information only;
    transmitting second packets comprising complementing information that complements the basic information independently of the first packet with basic information, the complementing information, when decoded by a receiver, increasing the quality of the basic information, wherein
    each second packet contains a field associated with the complementing information,
    each field describes how the complementing information of the second packet increases the quality of the basic information, and
    each field can be read out independently of the associated complementing information;
    further comprising transmitting the first packet without the field.

2. The method as claimed in claim 1, wherein
    information is transmitted describing a grouping used for the complementing information.

3. The method as claimed in claim 2, wherein
    the information describing the grouping is transmitted upon connection establishment, before the complementing information, and
    the grouping is used for a subsequent transmission of the complementing information.

4. The method as claimed in claim 2, wherein
    the information describing the grouping is contained in the field.

5. The method as claimed in claim 1, wherein
    information about a configuration of the field is transmitted.

6. The method as claimed in claim 1, wherein
    the field of the packet is used in a decision as to whether the packet is to be forwarded to a receiver.

7. The method as claimed in claim 1, wherein
the field of the packet is used in a decision as to whether the packet is to be decoded by a receiver.

8. The method as claimed in claim 1, wherein
the field of the packet describes that the complementing information increases the quality of the basic information by increasing a temporal resolution and/or by increasing a spatial resolution and/or by increasing a signal-to-noise ratio.

9. The method as claimed in claim 1, wherein
the field is an integral part of a packet header.

10. The method as claimed in claim 1, wherein
the basic information is video information.

11. The method as claimed in claim 4, wherein
information about a configuration of the field is transmitted.

12. The method as claimed in claim 11, wherein
the field of the packet is used in a decision as to whether the packet is to be forwarded to a receiver.

13. The method as claimed in claim 12, wherein
the field of the packet is used in a decision as to whether the packet is to be decoded by a receiver.

14. The method as claimed in claim 13, wherein
the field of the packet describes that the complementing information increases the quality of the basic information by increasing a temporal resolution and/or by increasing a spatial resolution and/or by increasing a signal-to-noise ratio.

15. The method as claimed in claim 14, wherein
the field is an integral part of a packet header.

16. The method as claimed in claim 15, wherein
the basic information is video information.

17. A method for receiving and processing of information by a receiver, comprising:
receiving a first packet with basic information only;
receiving second packets comprising complimenting information that compliments the basic information independently of the first packet with basic information, the complementing information, when decoded, increasing the quality of the basic information, wherein
each second packet contains a field associated with the complementing information,
each field describes how the complementing information of the second packet increases the quality of the basic information,
each field can be read out independently of the associated complementing information, and
the field is used by the receiver in a decision as to whether the packet is to be forwarded to a different receiver;
further comprising transmitting the first packet without the field.

18. A method for receiving and processing of information by a receiver, comprising:
receiving a first packet with basic information only;
receiving second packets comprising complimenting information that compliments the basic information independently of the first packet with basic information, the complementing information, when decoded, increasing the quality of the basic information, wherein
each second packet contains a field associated with the complementing information,
each field describes how the complementing information of the second packet increases the quality of the basic information,
each field can be read out independently of the associated complementing information, and
the field is used by the receiver in a decision as to whether the packet is to be decoded by the receiver;
further comprising transmitting the first packet without the field.

19. A transmitter for transmitting information, comprising:
a first transmission unit to transmit a first packet with basic information only;
a second transmission unit to transmit second packets comprising complementing information that complements the basic information independently of the first packet with basic information, the complementing information, when decoded by a receiver, increasing the quality of the basic information; and
an insertion unit to insert into the second packets a field associated with the complementing information, the field describing how the complementing information increases the quality of the basic information, such that each field can be read out independently of the associated complementing information;
further comprising transmitting the first packet without the field.

20. A receiver for receiving information, comprising:
a first receiver unit to receive a first packet with basic information only;
a second receiving unit to receive second packets comprising complementing information that complements the basic information independently of the first packet with basic information, the complementing information, when decoded, increasing the quality of the basic information, wherein
each second packet contains a field associated with the complementing information,
each field describes how the complementing information of the packet increases the quality of the basic information,
each field can be read out independently of the associated complementing information; and
a decision unit to decide, using the field, whether the packet is to be forwarded to a different receiver;
further comprising transmitting the first packet without the field.

21. A receiver for receiving information, comprising:
a first receiver unit to receive a first packet with basic information only;
a second receiving unit to receive second packets comprising complementing information that complements the basic information independently of the first packet with basic information, the complementing information, when decoded, increasing the quality of the basic information, wherein
each second packet contains a field associated with the complementing information,
each field describes how the complementing information of the packet increases the quality of the basic information,
each field can be read out independently of the associated complementing information; and
a decision unit to decide, using the field, whether the packet is to be decoded;
further comprising transmitting the first packet without the field.

* * * * *